(12) United States Patent
LaChapell et al.

(10) Patent No.: US 9,868,882 B2
(45) Date of Patent: Jan. 16, 2018

(54) LABELED PACKAGES

(71) Applicant: Synthomer USA LLC, Dover, DE (US)

(72) Inventors: Andrew LaChapell, Taylors, SC (US); Jong Guo, Charlotte, NC (US)

(73) Assignee: Synthomer USA LLC, Dover, DE (US)

( * ) Notice: Subject to any disclaimer, the term of this patent is extended or adjusted under 35 U.S.C. 154(b) by 0 days.

(21) Appl. No.: 15/295,896

(22) Filed: Oct. 17, 2016

(65) Prior Publication Data

US 2017/0073551 A1 Mar. 16, 2017

Related U.S. Application Data

(63) Continuation of application No. 14/523,380, filed on Oct. 24, 2014, now Pat. No. 9,472,126.

(51) Int. Cl.
| | |
|---|---|
| *C09J 7/02* | (2006.01) |
| *C09J 133/26* | (2006.01) |
| *G09F 3/10* | (2006.01) |
| *C08F 220/18* | (2006.01) |
| *C09J 133/08* | (2006.01) |
| *B65D 65/14* | (2006.01) |
| *B65D 65/38* | (2006.01) |
| *G09F 3/02* | (2006.01) |

(52) U.S. Cl.
CPC ............ *C09J 7/0217* (2013.01); *B65D 65/14* (2013.01); *B65D 65/38* (2013.01); *C08F 220/18* (2013.01); *C09J 133/08* (2013.01); *C09J 133/26* (2013.01); *G09F 3/10* (2013.01); *C08F 2220/1841* (2013.01); *C09J 2201/622* (2013.01); *C09J 2433/003* (2013.01); *G09F 2003/0241* (2013.01); *Y02P 20/582* (2015.11)

(58) Field of Classification Search
CPC ...... C09J 7/0217; C09J 133/26; C09J 133/08; C09J 2433/003; C09J 2201/622; C09F 3/10; C09F 2003/0241; C08F 220/18; C08F 2220/1841; B65D 65/14; B65D 65/38

USPC .......................................................... 524/556
See application file for complete search history.

(56) References Cited

U.S. PATENT DOCUMENTS

| | | | |
|---|---|---|---|
| 4,529,772 A | 7/1985 | Druschke et al. | |
| 5,563,241 A | 10/1996 | Beezhold | |
| 7,115,682 B2 * | 10/2006 | Guo .......................... | C08F 8/30 524/556 |
| 9,472,126 B2 | 10/2016 | LaChapell et al. | |
| 2004/0143058 A1 | 7/2004 | Guo et al. | |
| 2006/0247367 A1 | 11/2006 | Guo et al. | |
| 2009/0252959 A1 | 10/2009 | Schumacher et al. | |
| 2010/0051200 A1 | 3/2010 | Mueller et al. | |
| 2013/0048221 A1* | 2/2013 | Blackwell .............. | C09J 7/0246 156/703 |
| 2014/0069587 A1 | 3/2014 | Rackovan et al. | |
| 2014/0088220 A1* | 3/2014 | Havaux .................. | C09J 131/02 523/122 |

FOREIGN PATENT DOCUMENTS

WO  WO 2004/029172 A1  4/2004

OTHER PUBLICATIONS

Extended European Search Report dated Sep. 15, 2017 for European Patent Application No. 15852564.2, filed Oct. 22, 2015.

* cited by examiner

*Primary Examiner* — Michael M Bernshteyn
(74) *Attorney, Agent, or Firm* — Knobbe Martens Olson and Bear, LLP

(57) ABSTRACT

A labeled package includes a polymeric package, a filmic facestock material as a label on the polymeric package, and a pressure sensitive adhesive adhering the filmic facestock material to the polymeric package. The pressure sensitive adhesive composition includes a monomer mixture, which includes at least one monomer that is free radical polymerizable and whose homopolymer has a glass transition temperature of less than or equal to 10° C.; at least one mono-olefinically unsaturated monomer having aldehyde or ketone functionality; and at least one polyhydrazide crosslinker having hydrazine functionality.

23 Claims, 1 Drawing Sheet

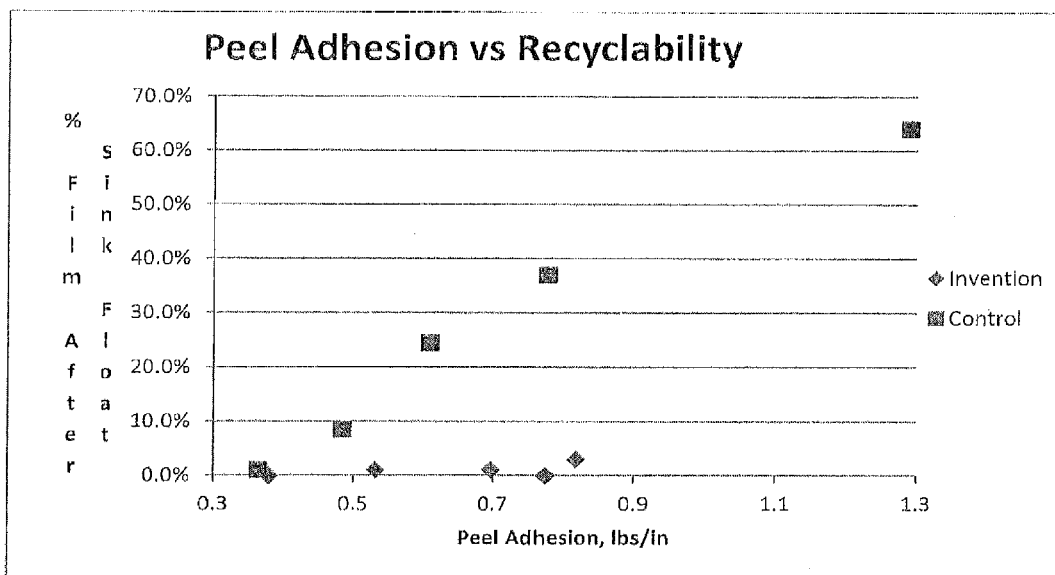

LABELED PACKAGES

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The present invention relates to aqueous emulsion pressure sensitive adhesive (PSA) compositions useful with facestocks and/or packaging labels designed to be removed in the recycling of polymeric packaging.

Description of the Related Art

In recent years, use of polymeric packaging (e.g. polyethylene terephthalate (PET), high density polyethylene (HDPE), polyvinyl chloride (PVC), polypropylene (PP), or other plastic types) has increased due to their lightweight and break resistance. Pressure sensitive filmic labels have also grown in usage with polymeric packaging systems due to improved moisture resistance and appearance, and the ability to recycle such packaging materials is desirable. During a typical recycling process, a hot caustic bath containing surfactant is used to release the ground plastic flake from the label. Subsequently the plastic flake is separated in a sink-float process from the removed label. The Association of Postconsumer Plastic Recyclers (APR) have established protocol for evaluating labeling systems for recyclability. Failure to remove the filmic labels in the recycling process taints the color and reduces the clarity of recycled PET.

Filmic labels are more resistant to the recycling conditions which leads to a portion of the label still attached at the end of the process. Therefore, it would be desirable that the filmic label and adhesive be designed to release in the washing step of the recycling process, and to separate from the PET in a liquid, showing a specific gravity allowing for floating or sinking of the separated components.

Accordingly, there is a need for a pressure sensitive adhesive (PSA) for filmic labels that can facilitate separation in the recycling process while maintaining the desired performance properties through the article's life cycle.

There is also a need in the art for polymeric packaging systems that can provide for a recycling process which is efficient and cost effective.

SUMMARY OF THE INVENTION

In one embodiment, there 1s provided a filmic facestock material for polymeric packaging which includes a pressure sensitive adhesive (PSA) composition. The PSA includes (a) at least one monomer which may undergo free radical polymerization and whose homopolymer has a glass transition temperature (Tg) of less than or equal to 10° C., (b) at least one mono-olefinically unsaturated monomer having aldehyde or ketone functionality, and (c) an effective amount of at least one polyhydrazide crosslinker having hydrazine functionality. The PSA composition of the invention exhibits a peel adhesion value of between about 0.4 lbs/in (70 N/m) and about 4 lbs/in (700 N/m), and the percent film remaining on the polymeric packaging after a sink-float testing is 0% to about 8%. In another embodiment, the PSA composition of the invention further includes a surfactant with a reactive carbon-carbon double bond.

In another embodiment, there is provided a filmic facestock material for polymeric packaging which includes a PSA composition. The PSA composition includes (a) 50 wt % to about 95 wt % of at least one monomer which may undergo free radical polymerization and whose homopolymer has a glass transition temperature (Tg) of less than or equal to 10° C., (b) >0.1 wt % at least one mono-olefinically unsaturated monomer having aldehyde or ketone functionality, (c) an effective amount of at least one polyhydrazide crosslinker having hydrazine functionality, and a surfactant with a reactive carbon-carbon double bond, with the wt % being based on the weight of the monomer mixture, with the effective amount of the polyhydrazide crosslinker is such that the ratio of the hydrazine functionality is between about 0.02 to 5 equivalents per 1 equivalent of the aldehyde or ketone functionality. The PSA composition of the invention exhibits a peel adhesion value of between about 0.4 lbs/in (70 N/m) and about 4 lbs/in (700 N/m), and the percent film remaining on the polymeric packaging after a sink-float testing is from 0% to about 8%.

BRIEF DESCRIPTION OF THE DRAWINGS

FIG. 1 is a scatter plot of Peel Adhesion v. Recyclability for PSA compositions of the invention and control PSA compositions.

DETAILED DESCRIPTION OF THE PREFERRED EMBODIMENT

The removable PSA compositions of the invention includes an acrylic polymer dispersion containing a monomer mixture having (a) at least one monomer which may undergo free radical polymerization. In one embodiment, the monomer mixture may include at least one acrylic acid ester or (meth)acrylate acid ester whose homopolymer has a glass transition temperature (Tg) of less than or equal to 10° C., and (b) at least one mono-olefinically unsaturated monomer having an aldehyde or ketone group. The emulsion of the invention being reacted with (c) an effective amount of at least one polyhydrazide crosslinker.

Examples of the at least one acrylic acid ester or (meth)acrylate acid ester whose homopolymer has a glass transition temperature (Tg) of less than or equal to 10° C. include but are not limited to benzyl acrylate, n-butyl acrylate, sec-butyl acrylate, cyanoethyl acrylate, iso-decyl acrylate, n-decyl acrylate, dodecyl acrylate, dodecyl methacrylate, 2-ethoxyethyl acrylate, ethyl acrylate, 2-ethylhexyl acrylate, 2-ethylhexyl methacrylate, n-hexyl acrylate, hexyl methacrylate, isobutyl acrylate, isopropyl acrylate, isotactic, 2-methoxyethyl acrylate, methyl acrylate, octadecyl methacrylate, octyl methacrylate, 2-phenylethyl acrylate, n-propyl acrylate, and 2,2,2-trifluoroethyl acrylate, as well as mixtures or any subset thereof.

In one embodiment, Tg of the acrylic acid ester or (meth)acrylate acid ester homopolymer is between about −100° C. and 10° C., or between about −70° C. to 10° C., or between about −70° C. to −10° C.

In one embodiment, the at least one acrylic acid ester or (meth)acrylate acid ester whose homopolymer has a glass transition temperature (Tg) of equal to or less than 10° C. is present in an amount of about 50 wt % to about 95 wt % or about 70 wt % to about 90 wt % based on the weight of the monomer mixture.

In one embodiment, the at least one acrylic acid ester or (meth)acrylate acid ester whose homopolymer has a glass transition temperature (Tg) of equal to or less than 10° C. includes 2-ethylhexyl acrylate, n-butyl acrylate, or any mixtures thereof.

Mono-olefinically unsaturated monomers having ketone or aldehyde functionality are monomers containing an aldo or keto moiety and a polymerizable carbon-carbon double bond. Examples include, but are not limited to, acrolein, methacrolein, vinylbenzaldehyde, crotonaldehyde, (meth) acryloxyalkylpropanals diacetone acrylamide (DAAM), diacetone acrylate, or any mixtures or subsets thereof.

In one embodiment the amount of mono-olefinically unsaturated monomers having aldehyde or ketone functionality is present in an amount of >0.1 wt %, or about 0.5 to 10 wt. %, or about 0.75% to 5 wt. %, based on the weight of the monomer mixture.

In one embodiment, the mono-olefinically unsaturated monomers having ketone or aldehyde functionality includes diacetone acrylamide, diacetone acrylate, acrolein, or any mixtures thereof.

In one embodiment the monomer mixture may optionally include one or more acrylic acid ester or (meth)acrylate acid ester whose homopolymer has a Tg of greater than 10° C. such as, for example greater than 10° C. to about 175° C. Examples include but are not limited to benzyl methacrylate, t-butyl acrylate, 2-teii-Butylaminoethyl methacrylate, butyl methacrylate, t-butyl methacrylate, cyclohexyl acrylate cyclohexyl methacrylate, diethylaminoethyl methacrylate, dimethylaminoethyl methacrylate, ethyl methacrylate, hexadecyl acrylate, hexadecyl methacrylate, hexyl acrylate, 2-hydropropyl methacrylate, 2-hydroxyethyl methacrylate, isobornyl acrylate, isobornyl methacrylate, isobutyl methacrylate, isopropyl methacrylate, methyl methacrylate, atactic, methyl methacrylate, syndiotactic, phenyl methacrylate and trimethylsilyl methacrylate, as well as mixtures or any subset thereof.

In one embodiment, the at least one acrylic acid ester or (meth)acrylate acid ester whose homopolymer has a glass transition temperature (Tg) of greater than 10° C. is present in an amount of about 0 wt % to about 50 wt %, or about 0 \:vt % to about 30 wt % based on the weight of the monomer mixture.

In one embodiment, the monomer mixture may include one or more ethylenically unsaturated carboxylic acid. Examples included but are not limited to monoethylenically unsaturated monocarboxylic acids such as acrylic acid, methacrylic acid, ethacrylic acid, crotonic acid, and carboxyethyl acrylate, monoethylenically unsaturated dicarboxylic acids such as maleic acid, fumaric acid, itaconic acid, and citraconic acid, monoethylenically unsaturated tricarboxylic acids such as aconitic acid, and the halogen substituted derivatives (e.g., alphachloracrylic acid) and anhydrides of these acids (e.g., maleic anhydride and citraconic anhydride).

The PSA composition of the invention may comprise about 0.5 to about 7 wt % or about 1 to about 3 wt % ethylenically unsaturated carboxylic acids, based on the weight of the monomer mixture.

In one embodiment, the PSA composition of the invention may include an alkyl mercaptan chain transfer agent such as a C6-C1s alkyl mercaptan for example n-hexyl mercaptan, n-octyl mercaptan and n-dodecyl mercaptan. When utilized, the PSA composition of the invention may comprise about 0.01 to about 0.5 wt % mercaptan chain transfer agents, based on the weight of the monomer mixture.

In another embodiment of the invention, the process to prepare the dispersions of the invention may utilize a continuous phase (usually water), and other components standard and known in the art such as initiators, reducing agents, surfactants, catalysts, wetting agents, crosslinking agents, preservatives and the like. For example, any conventional water soluble polymerization initiator suitable for emulsion polymerization may be used. The typical wt % of said initiators are from 0.01 wt. % to 2.0 wt. % and preferably 0.01 to about 1.0 wt % based on the total weight of monomers. Examples of initiators include, but are not limited to, persulfates, peroxides, azo compounds, and the mixtures thereof. The water soluble initiators can be used alone or in combination with one or more conventional reducing agents such as, but not limited to, sodium formaldehyde sulfoxylate, sodium metabisulfite, ascorbic acid, ferrous salts, chelated iron salts, and the like.

In one embodiment, the water soluble polymerization initiator systems are peroxides utilized in combination with conventional reducing agents such as tert-butyl hydroperoxide sodium formaldehyde sulfoxylate based systems with a chelated ferric complex catalyst.

Examples of suitable surfactant systems are those known in the art and include anionic, nonionic, cationic, or amphoteric emulsifiers and mixtures thereof. Examples of anionic surfactants include, but are not limited to, alkyl sulfates, sulfates of ethoxylate alcohols, aryl sulfonates, phosphates of ethoxylated alcohols, sulfosuccinates, sulfates and sulfonates of ethoxylated alkylphenols, and mixtures thereof. Examples of nonionic surfactants include, but are not limited to, ethoxylated alcohols, ethoxylated alkylphenols, and mixtures thereof. Examples of cationic surfactants include, but are not limited to, ethoxylated fatty amines. In one embodiment, reactive surfactant chemistry which have reactive carbon-carbon double bond is utilized. Examples of reactive chemistries include, but are not limited to, alkylphenol ethoxylates containing alkenyl substituents, polyoxyalkylene-1-(allyloxymethyl) alkyl ether sulfate salt compounds, salts of poly(oxy-1,2-ethanediyl), alpha-sulfoomega-[1-(hydroxymethyl)-2-(2-propen-yloxy)ethoxy] (Adeka SR Series, commercially available from Adeka Corporation), and mixtures or subsets thereof. In one embodiment, the reactive surfactant includes an Adeka SR Series reactive surfactant. The typical weight of surfactant is 0.2 to 5.0 wt. % and more preferably 1.0 to 5.0 wt. % and most preferably 1.0 to 3.0 wt. %. The surfactants are utilized by conventional methods that are well known in art. In one embodiment, the process to prepare the PSA includes the emulsification of the monomer mix with the surfactant system prior to the polymerization reaction.

Following polymerization, the pH of the latex emulsion is adjusted with a suitable base including, but are not limited to, metal hydroxides, ammonium hydroxide, amines, and mixtures thereof. The pH is adjusted to at least 6.0, and more preferably 6.5 to 9.5, and most preferably 7.0 to 9.0. In one embodiment, the suitable base is ammonium hydroxide.

The PSA emulsion of the invention has a typical solids content from about 30 to 70% and preferably 40 to 55%. Polymerization can be conducted at typical temperatures for emulsion polymerization. The polymerization is preferably conducted in the range of 110° F. (43.3° C.) to 210° F. (99° C.) and more preferably 130° F. (54° C.) to 190° F. (88° C.).

The PSA compositions of the invention are reacted with an effective amount of polyhydrazide compound having at least two hydrazide (NH—NH2) functional groups. Specific examples of polyhydrazide compounds include, but are not limited to, oxalic acid dihydrazide, malonic acid dihydrazide, succinic acid dihydrazide, glutaric acid dihydrazide; adipic acid dihydrazide, sebacic acid dihydrazide; monoolefin unsaturated dicarboxylic acid dihydrazide such as maleic acid dihydrazide, fumaric acid dihydrazide, itaconic acid dihydrazide; carbonic acid initiator polyhydrazide such as carbonic acid dihydrazide; aromatic dihydrazides such as phthalic acid dihydrazide, terephthalic acid dihydrazide, isophthalic acid dihydrazide; trihydrazides such as 1,2,4-butanetricarbohydrazide, 1,1,4-butanetricarbohydrazide, 1,2,5-pentanetricarbohydrazide, 1,3,6-hexanetricarbohydrazide, 1,3,7-heptanetricarbohydrazide, and I-hydroxy-1,2,4-butanetricarbohydrazide, and mixtures or any subsets thereof. In one embodiment, the polyhydrazide includes adipic dihydrazide, isophthalic dihydrazide, sebacic dihydrazide, bis-semicarbizides, and mixtures thereof. In another embodiment, the polyhydrazide is adipic acid dihydrazide.

The effective amount of the polyhydrazide crosslinker is such that the ratio of hydrazine functionality is between about 0.02 to 5, or about 0.1 to 3 or about 0.5 to 2 equivalents per 1 equivalent of the ketone or aldehyde functionality of the mono-olefinically unsaturated monomers having ketone or aldehyde functionality. The polyhydrazide compound can be added at any point in the process. In one embodiment, it is added after the emulsion reaction. In one embodiment, the polyhydrazide crosslinker is optional.

The PSA compositions of the invention may be used with filmic or paper facestock materials. Examples of suitable filmic facestock materials include, but are not limited to, olefinic facestocks (e.g. polypropylene, polyethylene, etc), polystyrene facestocks, PET facestocks, polyvinyl chloride and mixtures thereof. The facestock constructions can contain multiple layers. The facestock can also contain a topcoat, printing, and/or overlaminates.

In one embodiment the PSA compositions of the invention typically exhibit peel adhesion values of less than about 4 lbs/in (700 N/m), less than about 2 lbs/in (350 N/m), less than about 1 lb/in (175 N/m) or between about 0.4 lbs/in (70 N/m) to about 4 lbs/in (700 N/m) or between about 0.4 lbs/in (70 N/m) to about 2 lbs/in (350 N/m). In another embodiment, during the recycling of polymeric packaging with filmic labels adhered with the PSA compositions of the invention, the percent film (% film) remaining on PET after sink-float testing is about 0% to about 8%, or about 0% to about 5%, or about 0% to about 3%.

In one embodiment, the PSA compositions of the invention are free of additives as described in U.S. Patent Publication No. 2010/0051200 as facilitating the caustic washing of the polymeric substrate during the recycling process. In is known in the art that use of such additives may impart moisture sensitivity to a PSA composition.

In order to provide a better understanding of the present invention including representative advantages thereof, the following examples are offered.

EXAMPLES

Example 1

In a 2 L jacketed glass reactor equipped with a reflux condenser, thermocouple, and 4-blade agitator, 1800.0 g of latex was prepared. The reactor was charged with 410.7 g of water, 5.6 g of Abex 2535 surfactant (available from Rhodia Solvay Group), and 0.0040 g of Dissolvine 4.5 catalyst (available from Akzo Nobel N.V.), heated to 140° F. (60° C.), and agitated from 100 to 300 rpms. The monomer preemulsion was prepared in a separate vessel by mixing 257.7 g of water, 16.1 g of Adeka SR 3025 (available from Adeka Corporation) surfactant, 2.4 g of Abex 2535 surfactant, 8.05 g of Surfynol 440 (available from Air Products and Chemicals, Inc.) wetting agent, 12.1 g of betacarboxyethyl acrylate, 8.1 g acrylic acid, 40.3 g butyl acrylate, 40.3 g ethyl acrylate, and 724.8 g 2-ethylhexyl acrylate. After the preemulsion was mixed and formed, 32.8 g of preemulsion was added to the reactor. And additional 32.2 g of Adeka SR3025 was added to the preemulsion. 24.2 g of water with 0.4 g of telibutyl hydroperoxide and 24.2 g of water with 0.2 g of sodium formaldehyde sulfoxylate was added to the reactor to create an in-situ emulsion seed. After the in-situ seed was formed indicated by an initial exotherm, the preemulsion was fed over 180 minutes and an oxidizer feed of 48.3 g of water with 2.4 g of telibutyl hydroperoxide and a reducer feed of 96.6 g of water with 1.2 g of sodium formaldehyde sulfoxylate were added over 300 minutes. The reaction was carried out at 138° F. (59° C.) to 142° F. (142° C.). After 90 minutes of the preemulsion being fed, 24.2 g of a 30% diluted in water diacetone acrylamide solution was added to the preemulsion. When the oxidizer and reducer feeds completed, the reactor was cooled to <110° F. (43° C.) and 8.1 g of water with 6.4 g of 28% aqueous solution ammonium hydroxide was added. 4.0 g of water with 1.6 g of Acticide LA preservative (available from Thor Specialties, Inc.) was added to the reactor. Examples 2 to 10 were synthesized in the same manner as Example 1 with the changes to the compositions set forth in Tables 1 and 2.

TABLE 1

| | Example | | | | |
|---|---|---|---|---|---|
| | 1 (Invention) | 2 (Control) | 3 (Control) | 4 (Control) | 5 (Invention) |
| 2-Ethylhexyl Acrylate | 724.8 | 734.6 | 733.9 | 728.0 | 644.2 |
| Methyl Methacrylate | 0.0 | 0.0 | 0.0 | 0.0 | 80.5 |
| DAAM 30% Solution | 24.2 | 0.0 | 0.0 | 0.0 | 24.2 |
| n-Dodecyl Mercaptan | 0.0 | 0.0 | 0.0 | 0.0 | 0.0 |
| Allyl Methacrylate | 0.0 | 0.0 | 1.6 | 0.0 | 0.0 |
| Hexanediol Diacrylate | 0.0 | 0.0 | 0.0 | 16.2 | 0.0 |

TABLE 2

| | Example | | | | |
|---|---|---|---|---|---|
| | 6 (Invention) | 7 (Invention) | 8 (Control) | 9 (Invention) | 10 (Control) |
| 2-Ethylhexyl Acrylate | 604.0 | 721.5 | 731.3 | 563.7 | 733.8 |
| Methyl Methacrylate | 120.8 | 0.0 | 0.0 | 161.1 | 0.0 |
| DAAM 30% Solution | 24.2 | 24.2 | 0.0 | 24.2 | 0.0 |
| n-Dodecyl Mercaptan | 0.0 | 0.0 | 0.0 | 0.0 | 0.8 |
| Allyl Methacrylate | 0.0 | 3.2 | 3.3 | 0.0 | 0.0 |
| Hexanediol Diacrylate | 0.0 | 0.0 | 0.0 | 0.0 | 0.0 |

Based on the foregoing, the total mass of the components of Examples 1 and 6 is 298.8 g, of which 24.2 g of a 30% solution of DAAM solution was included. (Only a portion of the 2-ethylhexyl acrylate included in the preemulsion was included in the reactor.) Thus, Examples 1 and 6 each have about 2.43% of aldehyde or ketone-functional olefinically unsaturated monomer.

The pH of each example was adjusted with 26 Be ammonium hydroxide to a pH of 8.3 to 8.5, and 1.0% of Surfynol 440 wetting agent was added. In the examples of the invention (i.e. examples 1 5, 6, 7 and 9) a stoichiometric equivalent amount of adipic dihydrazide to diacetone acrylamide was added. Samples were coated onto paper coated with silicone release liner at 10 g/m² and dried for 1-minute at 90° C. Afterward, the samples were laminated to 1.6 mils cavitated white biaxial oriented polypropylene and acclimated at room temperature for greater than 24-hours. The samples were applied to the substrates and aged I-hour at 50° C. followed by 1-hour cool to room temperature before testing.

The examples were tested according to the small scale laboratory test as described in "APR Screening Plastic Label and Closure Floatability Test for PET Bottles" (see www-.plasticsrecycling.org). However, the ground piece size was reduced from ⅜ inch to ¼ inch, which is believed to more accurately represent flake found at the recycling plants. In addition, the test temperature was reduced to 85° C. from 88° C. Peel adhesion was tested according to the Pressure Sensitive Tape Council standard PSTC 101 on PET substrate (ASTM Designation D3330 Standard Test Method for Peel Adhesion of Pressure-Sensitive Tape). The results are set forth in Table 3. The data in Table 3 is set forth in a scatter plot in FIG. 1.

TABLE 3

| Example | Peel Adhesion lbs/in (N/m) | % Film Remaining on PET After Sink-Float |
|---|---|---|
| Example 1 Invention | 0.532 (93) | 1.0% |
| Example 2 Control | 0.609 (106) | 24.5% |
| Example 3 Control | 0.484 (85) | 8.5% |
| Example 4 Control | 0.777 (136) | 37.0% |
| Example 5 Invention | 0.697 (122) | 1.0% |
| Example 6 Invention | 0.774 (135) | 0.0% |
| Example 7 Invention | 0.38 (66) | 0.0% |
| Example 8 Control | 0.365 (64) | 1.0% |
| Example 9 Invention | 0.818 (143) | 3.0% |
| Example 10 Control | 1.29 (226) | 64.0% |

An APR approved lab, Plastics Forming Enterprise (PFE) (see www.plasticsforming.com), following APR protocol, conducted an •independent evaluation in the recycling process using the PSA composition of Example 1 and resulting PET recycled plaques, compared to control non-labeled PET plaques. The results for the L*a*b* color scale and haze are set forth in Table 4 [L* (1OO=white; O=black) a* (positive=red; negative=green; O=gray) b* (positive=yellow; negative=blue; O=gray)]

TABLE 4

| Example | L* Values | a* Values | b* Values | L* average | a* Average | b* Average | Haze | Haze Average |
|---|---|---|---|---|---|---|---|---|
| Example 1 | 87.71 | −1.16 | 3.68 | 87.75 | −1.15 | 3.58 | 2.67 | 2.56 |
|  | 87.76 | −1.17 | 3.82 |  |  |  | 2.65 |  |
|  | 87.74 | −1.16 | 3.61 |  |  |  | 2.59 |  |
|  | 87.79 | −1.12 | 3.34 |  |  |  | 2.42 |  |
|  | 87.77 | −1.13 | 3.43 |  |  |  | 2.48 |  |
| Control PET | 87.76 | −1.23 | 3.74 | 87.78 | −1.21 | 3.66 | 2.47 | 2.45 |
|  | 87.85 | −1.21 | 3.68 |  |  |  | 2.17 |  |
|  | 87.78 | −1.21 | 3.63 |  |  |  | 2.57 |  |
|  | 87.83 | −1.19 | 3.5 |  |  |  | 2.08 |  |
|  | 87.67 | −1.22 | 3.76 |  |  |  | 2.96 |  |

Based on the above results, referring to the Examples of the invention, the addition of diacetone acrylamide chemistry to the PSA allows for recyclability at higher peel values which is desirable for labeling systems designed for polymeric packaging. In contrast, referring to control example 7, a peel level of below 0.40 lbs/in is needed to allow for sufficient label release from the PET flake during recycling.

What is claimed is:
1. A labeled package, comprising:
a polymeric package;
a filmic facestock material as a label on the polymeric package; and
a pressure sensitive adhesive adhering the filmic facestock material to the polymeric package, the pressure sensitive adhesive composition comprising a monomer mixture, wherein the monomer mixture comprises (a) at least one monomer that is free radical polymerizable and whose homopolymer has a glass transition temperature of less than or equal to 10° C., (b) at least one mono-olefinically unsaturated monomer having aldehyde or ketone functionality, and (c) at least one polyhydrazide crosslinker having hydrazine functionality;
wherein the pressure sensitive adhesive composition exhibits a peel adhesion value of between about 0.4 lbs/in (70 N/m) and about 4 lbs/in (700 N/m); and
wherein a percent film remaining on the polymeric packaging after a sink-float testing is from 0% to about 8%.
2. The labeled package of claim 1, wherein the at least one mono-olefinically unsaturated monomer having aldehyde or ketone functionality is present in an amount from 0.1 wt % to 5 wt. %.
3. The labeled package of claim 1, wherein the pressure sensitive adhesive composition further comprises a surfactant with a reactive carbon-carbon double bond.
4. The labeled package of claim 1, wherein the at least one monomer that is free radical polymerizable and whose homopolymer has a glass transition temperature of less than or equal to 10° C. comprises at least one acrylic acid ester or (meth)acrylate acid ester.
5. The labeled package of claim 4, wherein the least one acrylic acid ester or (meth)acrylate acid ester is selected from the group consisting of benzyl acrylate, n-butyl acrylate, sec-butyl acrylate, cyanoethyl acrylate, iso-decyl acrylate, n-decyl acrylate, dodecyl acrylate, dodecyl methacrylate, 2-ethoxyethyl acrylate, ethyl acrylate, 2-ethylhexyl acrylate, 2-ethylhexyl methacrylate, n-hexyl acrylate, hexyl methacrylate, isobutyl acrylate, isopropyl acrylate, isotactic, 2-methoxyethyl acrylate, methyl acrylate, octadecyl meth- acrylate, octyl methacrylate, 2-phenylethyl acrylate, n-propyl acrylate, and 2,2,2-trifluoroethyl acrylate, and combinations thereof.

6. The labeled package of claim 5, wherein the least one acrylic acid ester or (meth)acrylate acid ester is selected from the group consisting of 2-ethylhexyl acrylate, n-butyl acrylate, and combinations thereof.

7. The labeled package of claim 1, wherein the at least one mono-olefinically unsaturated monomer having an aldehyde or ketone functionality is selected from the group consisting of acrolein, methacrolein, vinylbenzaldehyde, crotonaldehyde, (meth)acryloxyalkylpropanals, diacetone acrylamide, diacetone acrylate, and combinations thereof.

8. The labeled package of claim 7, wherein the at least one mono-olefinically unsaturated monomer having an aldehyde or ketone functionality is selected from the group consisting of diacetone acrylamide, diacetone acrylate, acrolein, and combinations thereof.

9. The labeled package of claim 1, wherein the monomer mixture comprises: 50 wt % to about 95 wt % of the at least one monomer which may undergo free radical polymerization and whose homopolymer has a glass transition temperature of less than or equal to 10° C., and from 0.1 wt % to 5 wt. % of the at least one mono-olefinically unsaturated monomer having an aldehyde or ketone group, wherein the wt % is based on the weight of the monomer mixture.

10. The labeled package of claim 1, wherein the monomer mixture further comprises one or more ethylenically unsaturated carboxylic acid.

11. The labeled package of claim 1, wherein the monomer mixture further comprises at least one monomer that is free radical polymerizable and whose homopolymer has a glass transition temperature of greater than 10° C.

12. The labeled package of claim 1, wherein the hydrazine functionality is between about 0.02 to 5 equivalents per 1 equivalent of the aldehyde or ketone functionality.

13. The labeled package of claim 1, wherein the polyhydrazide is selected from the group consisting of oxalic acid dihydrazide, malonic acid dihydrazide, succinic acid dihydrazide, glutaric acid dihydrazide; adipic acid dihydrazide, sebacic acid dihydrazide; monoolefin unsaturated dicarboxylic acid dihydrazide; carbonic acid polyhydrazide; aromatic dihydrazides; trihydrazides, and combinations thereof.

14. The labeled package of claim 1, wherein polyhydrazide is selected from the group consisting of adipic dihydrazide, isophthalic dihydrazide, sebacic dihydrazide, bis-semicarbizides, and combinations thereof.

15. The labeled package of claim 1, wherein the polymeric packaging comprises polyethylene terephthalate, high density polyethylene, polyvinyl chloride, polypropylene or combinations thereof.

16. The labeled package of claim 1, wherein the filmic facestock comprises an olefinic facestock, a polystyrene facestock, a polyethylene terephthalate facestocks, a polyvinyl chloride or combinations thereof.

17. The labeled package of claim 3, wherein the surfactant with a reactive carbon-carbon double bond is selected from the group consisting of alkylphenol ethoxylates containing alkenyl substituents, polyoxyalkylene-1-(allyloxymethyl) alkyl ether sulfate salt compounds, salts of poly(oxy-1,2-ethanediyl), alpha-sulfo-omega-[1-(hydroxymethyl)-2-(2-propen-yloxy)ethoxy] and combinations thereof.

18. The labeled package of claim 1, wherein the facestock material is an olefinic facestock.

19. The labeled package of claim 3, wherein the surfactant with a reactive carbon-carbon double bond is selected from the group consisting of alkylphenol ethoxylates containing alkenyl substituents, polyoxyalkylene-1-(allyloxymethyl) alkyl ether sulfate salt compounds, salts of poly(oxy-1,2-ethanediyl), alpha-sulfo-omega-[1-(hydroxymethyl)-2-(2-propen-yloxy)ethoxy] and combinations thereof.

20. The labeled package of claim 13, wherein the monoolefin unsaturated dicarboxylic acid dihydrazide is selected from the group consisting of maleic acid dihydrazide, fumaric acid dihydrazide, and itaconic acid dihydrazide.

21. The labeled package of claim 13, wherein the carbonic acid polyhydrazide is carbonic acid dihydrazide.

22. The labeled package of claim 13, wherein the aromatic dihydrazide is selected from the group consisting of phthalic acid dihydrazide, terephthalic acid dihydrazide, and isophthalic acid dihydrazide.

23. The labeled package of claim 13, wherein the trihydrazide is selected from the group consisting of 1,2,4-butanetricarbohydrazide, 1,1,4-butanetricarbohydrazide, 1,2,5-pentanetricarbohydrazide, 1,3,6-hexanetricarbohydrazide, 1,3,7-heptanetricarbohydrazide, and I-hydroxy-1,2,4-butanetricarbohydrazide.

* * * * *

UNITED STATES PATENT AND TRADEMARK OFFICE
CERTIFICATE OF CORRECTION

PATENT NO. : 9,868,882 B2
APPLICATION NO. : 15/295896
DATED : January 16, 2018
INVENTOR(S) : Andrew LaChapell et al.

It is certified that error appears in the above-identified patent and that said Letters Patent is hereby corrected as shown below:

In the Specification

In Column 1 at Line 52, Change "1s" to --is--.

In Column 2 at Line 3, Change "wt %" to --wt. %--.

In Column 2 at Line 4, Change "wt %" to --wt. %--.

In Column 2 at Line 63, Change "wt %" to --wt. %--.

In Column 2 at Line 63, Change "wt %" to --wt. %--.

In Column 2 at Line 64, Change "wt %" to --wt. %--.

In Column 2 at Line 64, Change "wt %" to --wt. %--.

In Column 3 at Line 25, Change "2-teii-" to --2-tert- --.

In Column 3 at Line 30, Change "2-hydropropyl" to --2-hydroxypropyl--.

In Column 3 at Lines 39-40, Change "0 \:vt %" to --0 wt %--.

In Column 3 at Line 51, Change "alphachloracrylic" to --alphachloroacrylic--.

In Column 5 at Line 12, Change "bis-semicarbizides," to --bis-semicarbazides,--.

In Column 6 at Line 8 (approx.), Change "telibutyl" to --tertbutyl--.

In Column 6 at Line 13 (approx.), Change "telibutyl" to --tertbutyl--.

Signed and Sealed this
Eighteenth Day of June, 2019

Andrei Iancu
*Director of the United States Patent and Trademark Office*

CERTIFICATE OF CORRECTION (continued)
U.S. Pat. No. 9,868,882 B2

In Column 6 at Line 63, Change "I .0%" to --1.0%--.

In Column 6 at Line 65, Change "1 5," to --1, 5,--.

In Column 7 at Line 5, Change "I-hour" to --1-hour--.

In Column 7 at Line 26 (approx.), Change "Example I" to --Example 1--.

In Column 7 at Line 45 (approx.), Change "•independent" to --independent--.

In Column 7 at Line 56 (approx.), Change "Example I" to --Example 1--.

In Column 7 at Line 61 (approx.), Change "-I.23" to -- -1.23--.

In the Claims

In Column 9 at Line 20, In Claim 9, change "wt %" to --wt. %--.

In Column 9 at Line 20, In Claim 9, change "wt %" to --wt. %--.

In Column 10 at Lines 1-2, In Claim 14, change "bis-semicarbizides," to --bis-semicarbazides,--.